UNITED STATES PATENT OFFICE.

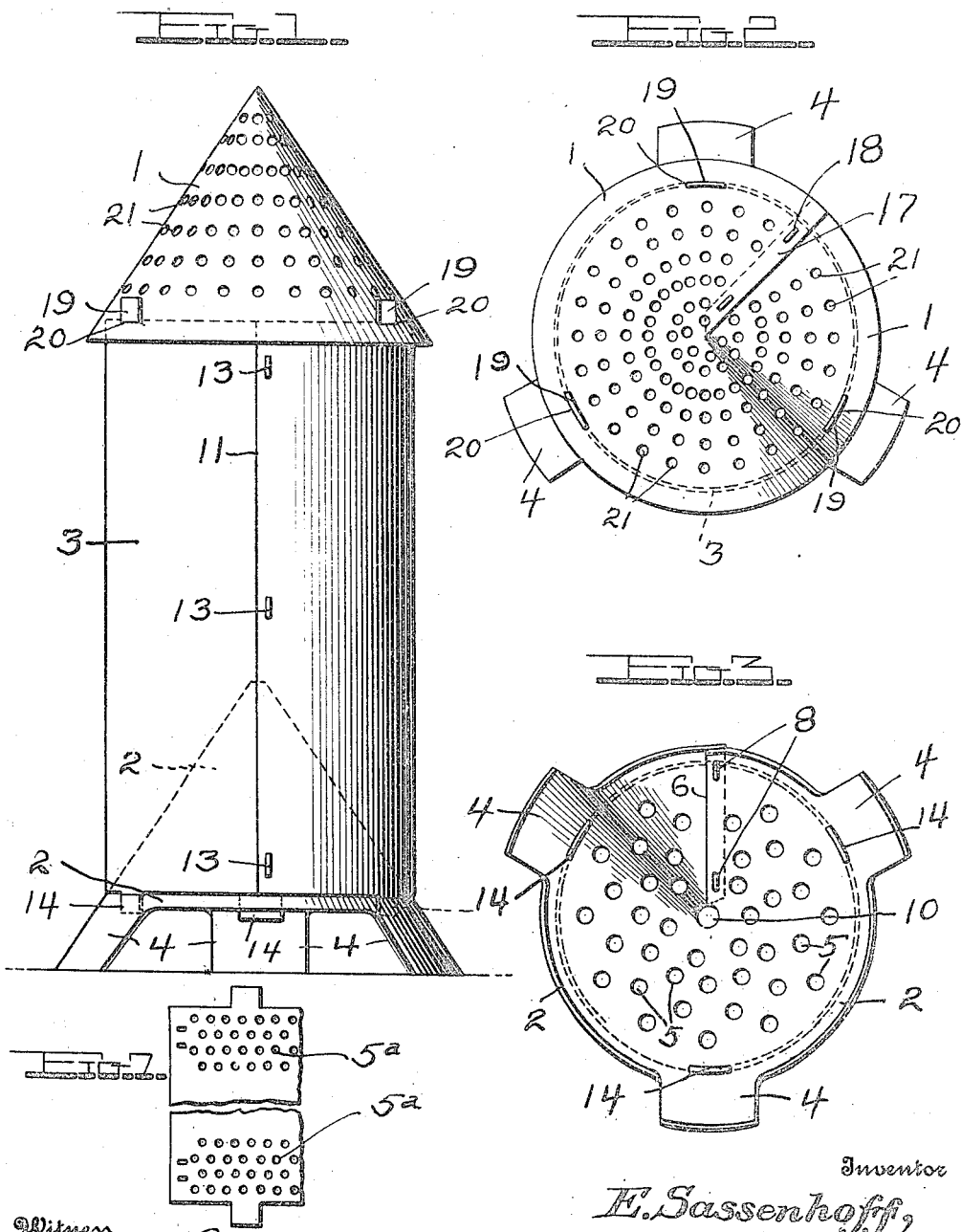

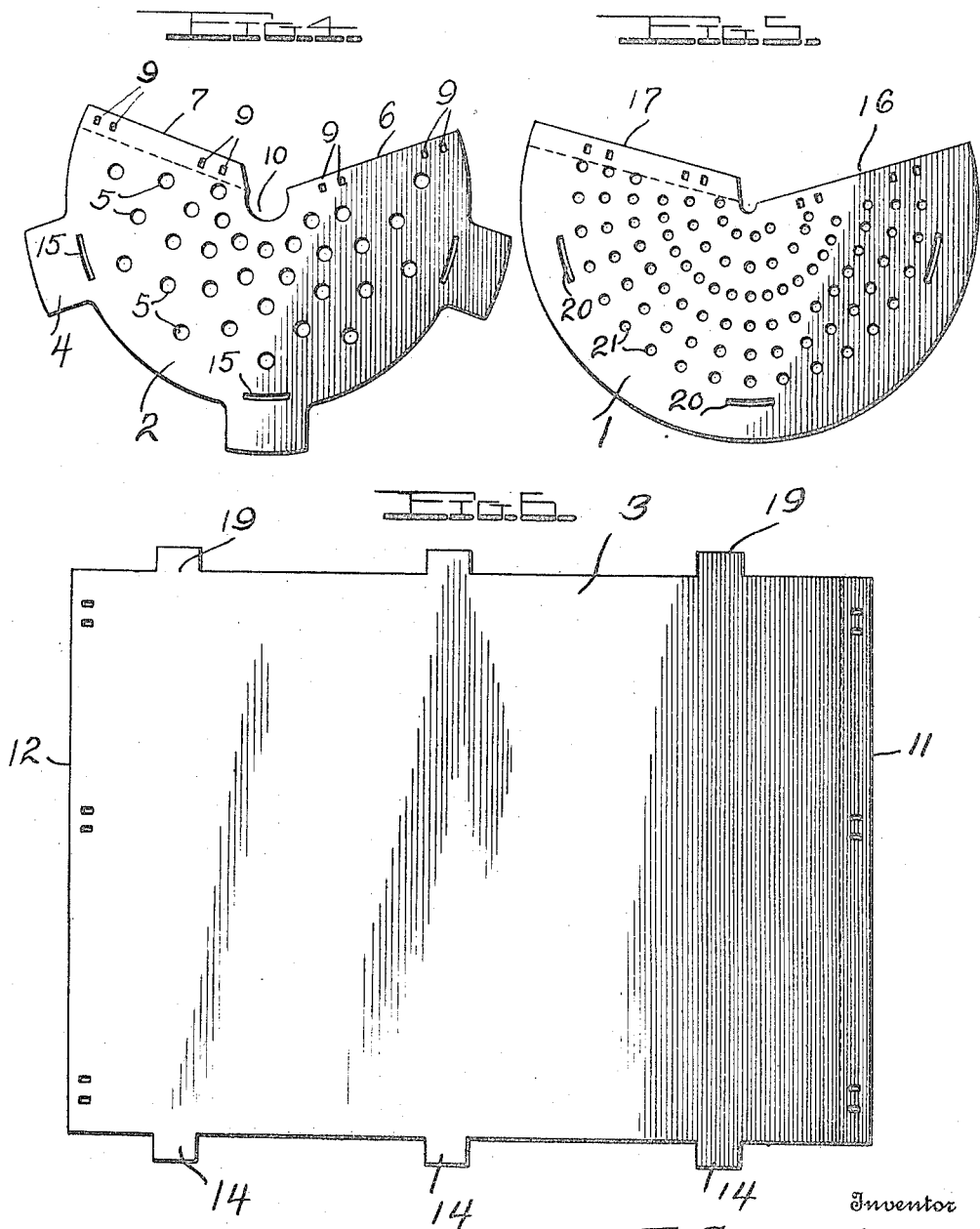

ERNESTO SASSENHOFF, OF ELKHART, INDIANA, ASSIGNOR TO THE DR. MILES MEDICAL COMPANY, OF ELKHART, INDIANA.

INSECT-TRAP.

1,247,724.

Specification of Letters Patent.     Patented Nov. 27, 1917.

Application filed July 31, 1916. Serial No. 112,299.

*To all whom it may concern:*

Be it known that I, ERNESTO SASSENHOFF, a citizen of the United States, residing at Elkhart, in the county of Elkhart and State of Indiana, have invented certain new and useful Improvements in Insect-Traps, of which the following is a specification.

This invention relates to insect traps, and is particularly adapted for use as a fly trap.

The primary object of the invention is to render the device adaptable for displaying advertisements in public places, as well as in private residences, to which end, one feature of the invention consists in constructing the device preferably of light cardboard or the like and to provide a large area of the outer surface of the device unobstructed and in plain view of observers.

A further object of the invention is to so construct the device that it may be readily shipped through the mails or conveniently packed in cartons for shipping, to which end, another feature of the invention consists in producing a so-called knock down advertising fly trap which is exceedingly easy to assemble and disassemble.

A still further object of the invention is to so construct the device as to render it readily cleaned, to which end, another feature consists in enabling either the top or the bottom of the device to be readily removed.

Still another object is to provide an exceedingly simple and cheap device which is not only adapted for advertising purposes, but capable of effectively carrying out its intended use.

The invention will be further described in detail with reference to the accompanying drawing, in which:—

Figure 1 is a side elevation of the device as assembled;

Fig. 2 is a top plan view;

Fig. 3 is a bottom view;

Fig. 4 is a plan view of the bottom closure and the supporting feet when disassembled;

Fig. 5 is a plan view of the top closure when disassembled;

Fig. 6 is a plan view of the body of the device when disassembled.

Fig. 7 is a detailed view of the body portion of the device illustrating the same with perforations.

Referring to the drawings in detail, the device contemplated by the invention primarily comprises three pieces, namely, a top 1, bottom 2 and body or side walls 3, all of which, as stated, being composed of some fibrous material such as light cardboard. All three pieces are adapted to be associated and arranged to produce a device as shown in Fig. 1, to which end, the bottom 2 is preferably produced from a single piece of material cut into a substantially three-quarter circle having projections 4 providing supporting feet and provided with perforations 5 throughout its surface for the admission of light to the device. A portion of the bottom is cut away to provide two confronting ends 6 and 7, both of which taper from the center of the piece toward the sides thereof, and are adapted to be joined together by lapping the end 7 over the end 6 and joining them by means of suitable staples or clips 8, engaging openings 9 provided in the ends. When the ends are thus joined, a conical shaped bottom closure for the device is provided, and by bending the projections 4 downwardly, suitable supporting feet are produced. The center of the piece is also provided with an opening 10 to admit of the insects occupying the interior of the device. As stated, the body of the device is produced of a single piece of material and it is adapted to be shaped into a cylindrical body by joining its ends 11 and 12, one of which, namely, the end 11, is adapted to overlap the end 12, and the ends are joined together by suitable staples or clips 13. In order that the body, when shaped in cylindrical form, may be supported by and surround the bottom closure 2, the body is provided with projections 14 which are adapted to be received in suitable openings 15 provided in the surface of the bottom closure adjacent the feet 4. The top 1 is produced in substantially a like manner as the bottom 2, that is to say, it is provided with two confronting ends 16 and 17 which are adapted to be overlapped and joined together by suitable staples 18 to provide a conical shaped top closure. In order that the top may be supported on the body of the device, the body is provided with suitable projections 19 which are adapted to be received in the openings 20 provided in the surface of the top. The top closure, like the bottom closure, is provided with perforations 21 throughout its surface to admit light within the device. These perforations in both the bottom and top, with the exception of the opening 10, are all small enough to prevent the flies from escaping. If desirable, the projections 14 and 19 on the top and bottom of the body 3, may be bent over after they have been received in the openings 15 and 20 to rigidly hold the parts in position. As stated, the device is supported by the feet 2 which will offer a readily accessible space for the flies to reach the opening 10 in the bottom of the device, and through which they will enter the device and be trapped.

The advertising matter that is to be displayed may be either printed on the body 3, or be displayed by labels pasted thereon, or in any other desirable manner. The idea is to offer as much space as possible for use in displaying advertisements, and, at the same time, provide a device which is not dark on the inside, as flies will not enter a darkened receptacle. This is offset by the fact that the perforations which are provided in both the top and bottom permit sufficient light to enter the device. As the device is a so-called knock down fly trap, it may be readily shipped, assembled or disassembled. To clean the device, either the top or bottom closure is removed.

I claim:—

An advertising knock down fly trap composed of three pieces of sheet material and embodying in its structure a perforated bottom piece constructed in substantially the shape of a sector of a circle, adapted to be arranged to form a conical bottom closure, a substantially square body piece adapted to be arranged to form a cylindrical body for the device, a perforated top piece constructed in substantially the shape of a sector of a circle adapted to be arranged to form a conical top closure, said bottom and top pieces having openings provided in their surfaces and said body piece having projections on its top and bottom adapted to be received in the openings of the bottom and top piece respectively, said bottom piece also having integral projections adapted to provide supporting feet for the device, and a recess in said bottom piece adapted to form an opening in the peak of the conical bottom closure.

The foregoing specification signed at Elkhart, Indiana, this 10th day of July, 1916.

ERNESTO SASSENHOFF.

Copies of this patent may be obtained for five cents each, by addressing the "Commissioner of Patents, Washington, D. C."